Jan. 26, 1971

N. J. BAECKLUND 3,557,604

METHOD AND APPARATUS FOR MEASURING OF A GAS FORMING
PART OF A GAS MIXTURE, PREFERABLY FOR MEASURING
THE QUANTITY OF CARBON OF SOLID BODIES
SUCH AS STEEL AND CARBIDES

Filed Oct. 25, 1968

INVENTOR.
Nils Johannes Baecklund
BY
Pierce, Scheffler & Parker
his Attorneys

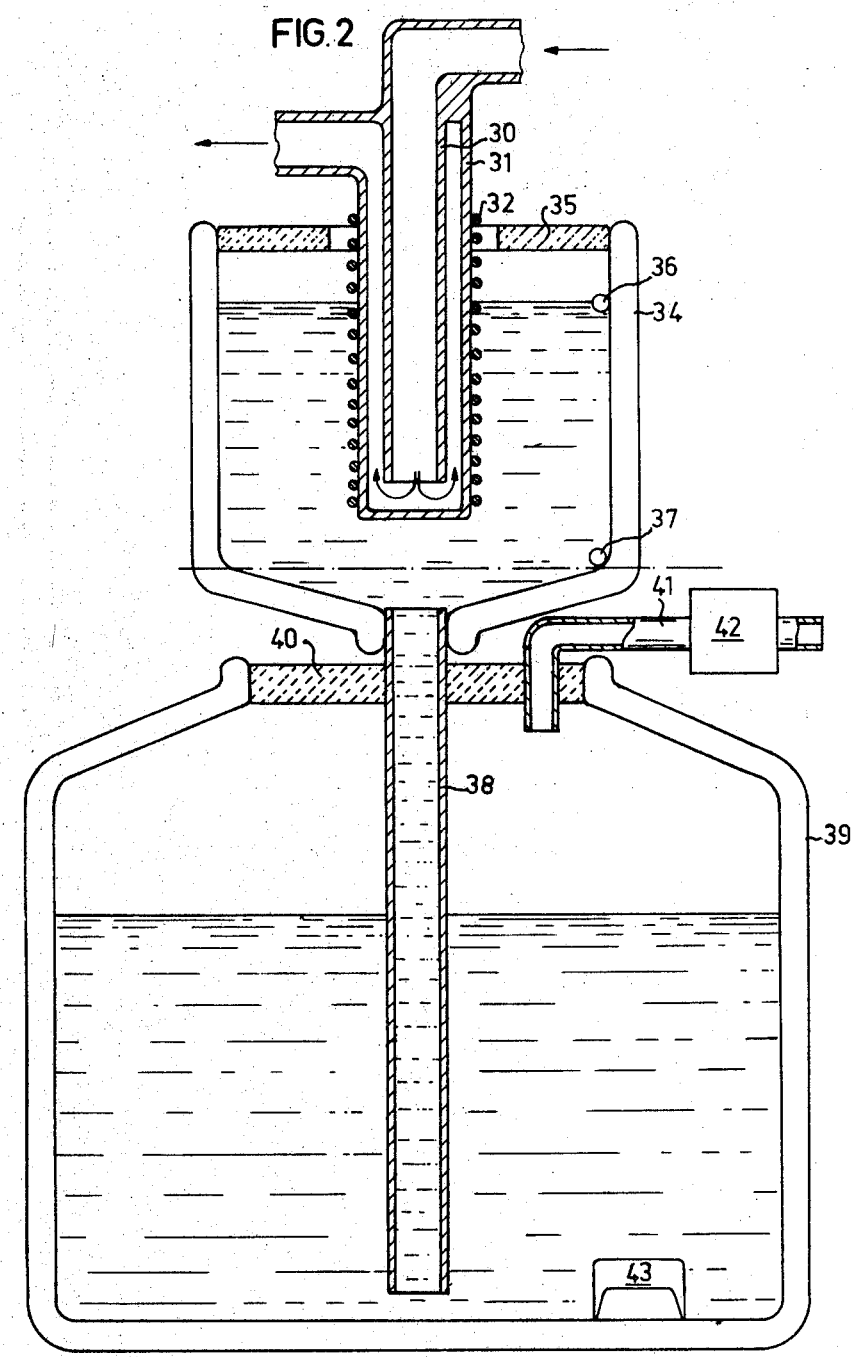

United States Patent Office

3,557,604
Patented Jan. 26, 1971

3,557,604
METHOD AND APPARATUS FOR MEASURING OF A GAS FORMING PART OF A GAS MIXTURE, PREFERABLY FOR MEASURING THE QUANTITY OF CARBON OF SOLID BODIES SUCH AS STEEL AND CARBIDES
Nils Johannes Baecklund, Flygeln, Sweden, assignor to Avesta Jernverks Aktiebolag, Avesta, Sweden, a corporation of Sweden
Filed Oct. 25, 1968, Ser. No. 770,760
Claims priority, application Germany, Apr. 29, 1968, 1,773,315
Int. Cl. G01n 7/04
U.S. Cl. 73—19                                     10 Claims

ABSTRACT OF THE DISCLOSURE

An automatical analyser measures the percentage of a component such as carbon, sulphur, hydrogen, etc. of a solid, liquid or gaseous substance, particularly the carbon contents of steel, hard metals and carbides, by low pressure measurement of gas. A sample of said substance is decomposed, for example thermically, to release said component in gaseous form, preferably as a suitable gaseous oxide or similar compound. After purification, the component gas thus obtained is separated from all other gases by a freezing process and the component gas is frozen and cooled to a temperature lower than the freezing point thereof. The space containing said frozen gas is hermetically sealed and evacuated. Then, the frozen gas is evaporated and passes through an evacuated gas line into an evacuated space of a pressure gauge device wherein the component gas is refrozen. Then the latter space is cut off from said line and the first space. The frozen gas is evaporated again and caused to operate the pressure gauge device under constant volume and temperature condition so that this device indicates the pressure of the evaporated gas, which pressure is a measure of the quantity of the gas in dependence on the gas constant, constant volume, constant temperature and variable pressure.

---

Figure 1:
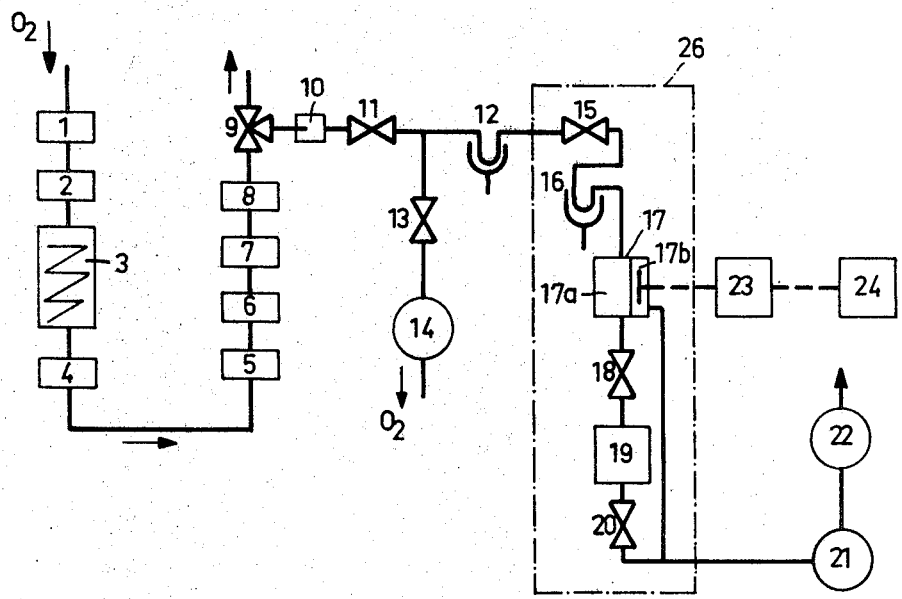

The method and apparatus according to the invention serves for quantitative measurement of a given gaseous component of a gas mixture by the low pressure method, more particularly for measurement of the contents of carbon of substances being in any state of aggregation per se. The invention is especially suitable for a fast, extremely accurate, automatic measurement of the percentage of carbon of steel, hard metals, carbides, etc., and an accuracy and speed, unrivalled hitherto, is ensured even if very small test samples of, say, 0.01 gram (10 milligrams) are used. Thus the method and apparatus is useful also for quickly and accurately determining the contents of carbon monoxide and dioxide in exhalated human breathing air and for determining the contents of carbon or sulphur or phosphorus, etc. of metals, plastics and industrial exhaust gases.

Since long ago numerous different methods of determining the carbon content have been developed, wherein the carbon is converted into carbon dioxide unless the carbon already exists in dioxide form. It is also known to inject carbon monoxide into an electrolyte, for example into soda lye NaOH whereby soda $Na_2CO_3$ is formed, and then the electrical conductivity of the electrolyte is measured (Wösthoff method). Furthermore it is known to absorb chemically or physically the carbon dioxide and to measure the dioxide by determining the weight. Finally, volumetrical and manometrical methods are know by which the carbon dioxide is thoroughly separated from all other components before being measured. The methods known hitherto still have one or another disadvantage insofar as they are either inaccurate or time consuming, or require skilled operators, or are limited by conditions restricting the usefulness.

The invention makes it possible to carry out automatic measurement within a very short time and with highest accuracy. As an example only it may be mentioned that the percentage of carbon of minute steel samples—10 milligrams=about 1.3 mm.³ suffice—could be measured during a time period of 3–7 minutes and with an accuracy of better than 0.1% for carbon percentages between 0.015 and 7%. The total measuring range of the instrument was from 0.0002 to 10% carbon contents in the sample. Said values were obtained with a first experimental apparatus and probably may be improved.

As regards the physical data of various gases upon which data the following description is based, the literature in this field is referred to, particularly "Ullmanns Enzyklopädie der technischen Chemie," third edition, editors: Verlag Urban und Schwarzburg, Berlin and Munich (printed from 1960 and onwards), especially the volumes 9 and 15, 16 for $CO_2$, $O_2$ and $N_2$. For a better understanding it may be mentioned that the freezing point (sublimation point) of $CO_2$ is $-78.5°$ C. at normal atmospheric pressure and about $-58°$ C. at 5 atmospheres above said normal pressure and about $-158°$ C. in vacuum. The boiling and freezing points of CO are $-192$ and $-204°$ C. at normal atmospheric pressure, those of $O_2$ at normal pressure are $-183$ and $-204°$ C. (vapour pressure .0018 atm. at $-218°$ C. and .062 atm. at $-203°$ C.), the boiling and freezing points of $N_2$ at normal atmospheric pressure are approximately $-196$ and $-210°$ C. The freezing points of the most important nitrogen oxides and nitrous gases vary between $-91°$ C. (laughing gas, $N_2O$) and $-164°$ C. (NO).

The accompanying drawing shows by way of example an apparatus according to the invention which automatically analyses the percentage of carbon of carbides and of hard metal and steel samples. FIG. 1 is a block diagram of the apparatus, and FIG. 2 is an axial section of a liquid gas trap, i.e. a freezing trap being one of a plurality of similar traps provided in the apparatus.

As shown in FIG. 1 a flow of oxygen being as pure as possible is supplied to a filter 1 at a controlled constant rate of approximately 75 litres per hour. The filter 1 contains copper monoxide CuO heated to at least 300° C. and in the present example to 350° C. to convert into carbon dioxide $CO_2$ any carbon monoxide possibly occurring in the oxygen flow. The copper monoxide may be mixed with manganese dioxide, if desired. A filter 2 provided subsequent to filter 1 is filled with a substance known under the trademark "Ascarite" which combines with carbon dioxide, practically without any remainder being left of the latter. The output of the filter is carbon-free oxygen and is supplied to a furnace 3 housing the steel sample to be analysed and heating same to such an extent that the carbon contents of the steel is practically completely burned. In the present case the furnace 3 is shown as a radio frequency induction furnace inductively heating the steel sample to approximately 1700° C. and, for instance, has a power of 1 kw. and a frequency of 10 mc. The optimal frequency and power of the induction furnace is dependent on, inter alia, the thickness and size of the steel or hard metal samples to be analysed. A relatively high frequency is preferred for investigating chips or dust of steel. Also other types of furnaces are useful per se, provided that no carbon and thus also no gas of combustion of a heating element may penetrate into the heating space of the steel sample, and that the full temperature of the steel sample is reached very rapidly, and that the furnace may be de-energized as rapidly as possible. It should be noted that a dielectrically heating radio frequency furnace, i.e. a so-called electronic microwave furnace, is very suitable for analysing samples of low or none electrical conductivity.

It is important that the heating space for the steel sample always remains sealed so that the carboniferous gas mixture generated by heating the steel sample can escape only and exclusively into the filter 4 described below, and thus neither to the free atmosphere, nor back into the filter 2. Any back escape to the filter 2 can be prevented by supplying the oxygen flow at a sufficient pressure or by a valve or stop cock. The filter 4 is a dust filter absorbing solid particles which might occur in the supplied gas mixture. The gas passing through the filter 4 enters a filter 5 containing manganous dioxide to absorb sulphur dioxide and similar compounds of sulphur. The filter 5 is followed by a heated filter 6 of the same type as filter 1. Also the filter 6 serves to oxidize to carbon dioxide any carbon such as carbon monoxide which may occur in the gas so that all carbon originating from the steel sample in the furnace 3 is converted into carbon dioxide.

The output of filter 6 is connected to a filter 7 absorbing moisture and being filled preferably with phosphorous pentasulphide. This filter is followed by a further filter 8 absorbing solid suspended particles.

The filters referred to above need not be entirely separate constructive units. Two or more filters may be combined to form a constructive unit and, sometimes, even a functional unit.

By the foregoing procedure those gas components of the gas mixture which freeze at a higher temperature than the gas to be measured are chemically and/or physically absorbed.

The output of the filter 8 is connected to a three-way valve 9 by which it may be changed over to an exit into the free atmosphere or to a gas choke 10 such as a Venturi tube beyond which choke the gas flow supplied under pressure expands and, consequently, is heavily cooled. The output of the choke 10 is connected through a freezing trap 12 to the input of an analysing unit 26, and this input is formed by one connection of a vacuum-tight stop valve 15. Mainly for avoiding a condensation of oxygen in the trap 12, the trap can be evacuated through a stop valve 13 connected between the valve 9 and the trap 12 to a vacuum pump 14. To some extent also the choke 10 prevents condensation of the oxygen.

The analysing unit 26 comprises the components 15–20 described below which are located in a common fluid bath consisting of, say, oil. The temperature of this bath is kept constant, for example at $+40°$ C., by means of a temperature stabilizer such as a thermostat. The input of the unit 26 is connected through the stop valve 15 and a second freezing trap 16 to the measuring chamber 17a of a pressure measuring device 17. This device 17 is of a well-known construction and provides an electrical signal proportional to the pressure and contains, apart from said chamber 17a for the pressure to be measured also a reference pressure chamber 17b, the two chambers being separated and sealed from one another by a diaphragm of special form. The diaphragm is deformed by any differential pressure between the two chambers. Such deformation causes a variation of an electrical capacitance and thereby a variation of said electrical signal. This signal is supplied through an amplifier 23 forming the shape of the signal in a desired way to a digital voltmeter 23 having a number of ranges, or to a similar measuring instrument. The combination 17, 23, 24 is known per se and operates at pressures ranging from 1 microbar to 1 bar, that is in a range 1:1,000,000 with an extremely high degree of linearity and accuracy.

The construction of the freezing trap 16 may be the same as that of the trap 12 but may have a much smaller size. The output of the trap 16 is connected to the measuring gas chamber 17a of the pressure measuring device 17. Said chamber is also connected to the output of the analysing unit 26 through a gas chamber 19 for the gas to be measured and through a further stop valve 20. Said output is connected to the free atmosphere through a high-vacuum diffusion pump 21 and a rotating backing pump 22. Within the unit 26 its output is also connected to the reference pressure chamber 17b of the device 17 so that this chamber can be evacuated and the reference pressure may be very low, e.g. about .001 torr or less in the present case.

FIG. 2 shows an embodiment of the freezing trap 12 and/or 16. The freezing traps serve to separate the carbon dioxide from the carrier gas, that is from the oxygen, by freezing. Such separation must be very thorough so that actually all carbon dioxide supplied by the furnace 3 is measured when measuring the pressure in the unit 26, and so that such measurement is not impaired by foreign gases of external origin such as oxygen.

The gas mixture consisting of oxygen and carbon dioxide is supplied through a vertical tube 30, the lower end of which is open. This tube is coaxially surrounded by a tube 31 of larger diameter which is closed at the lower end thereof. The gas flows through the tube 31 and then through the space between the tubes 30, 31 and continues to the analysing unit 26 (FIG. 1). The outer tube 31 is surrounded by an electrically heating coil 32 of a suitable wire such as platinum, stainless steel or a special alloy. The elements 30, 31, 32 are mechanically joined and greater part thereof is provided in a Dewar vessel 34, the upper aperture of which is partly or entirely closed by a thermically insulating lid or cover 35. Two electrical temperature sensing elements or probes 36, 37, for example thermistors or thermo-couples, are mounted in the vessel 34 at individual different levels. The probe 37 need not be provided in the upper vessel 34, and it is preferred to provide it in a downtake 38 or in the lower vessel 39. The thermically insulated downtake or rising pipe 38 extends from the bottom of the vessel down into a second Dewar vessel 39 of considerably larger volume (e.g. 10 litres) as the upper vessel 34. The downtake 38 ends close to the bottom of the supply vessel 39 which is covered by a gas-tight pressure-proof thermically insulating cover 40. A gas exhaust 41 extends, however, through the cover and includes a stop valve 42 being electrically controlled. The lower vessel 39 also contains an electrical heater 43.

For the present purpose the ower vessel 39 is filled with liquid nitrogen. Initially the valve 42 may be open. When the heater 43 is switched on and the valve 42 is closed, a small fraction of the liquid nitrogen evaporates so that a gas pressure is developed below the cover 40 of the volume of the vessel and forces liquid nitrogen upwards through the downtake 38 so that the upper vessel 34 will be filled with liquid nitrogen. When the liquid nitrogen rises to the upper temperature probe 36 the probe is rapidly and strongly cooled, namely down to about $-196°$ C., and generates an electrical signal switching off the heater 43. Thus the upper vessel 34 remains filled with liquid nitrogen. In this condition when oxygen and carbon dioxide are supplied through the tubes 30, 31 the carbon dioxide is frozen and condensed on the bottom and lateral wall of the tube 31 whereas the oxygen being cooled to at least $-210°$ C. or to a lower temperature remains gaseous and continues flowing. If then the gas supply is interrupted and the tubes 30, 31 are strongly evacuated, only the frozen carbon dioxide remains in the tubes and is supercooled because the freezing point (sublimation point) in high-vacuum is approximately $-160°$ C. and thus is still $36°$ C. higher than the temperature of liquid nitrogen. By this supercooling sublimation losses of carbon dioxide during said evacuation are avoided.

After the evacuation, the valve 42 will be opened so that the pressure in the lower vessel 39 is released and the liquid nitrogen of the upper vessel 34 returns down into the lower vessel. This return flow is, however, interrupted when cooling of the lower temperature probe 37 by liquid nitrogen ceases so that then only a small additional quantity of liquid nitrogen can pass down into the lower vessel. The lower probe 37 may be dispensed with, however, particularly if the downtake 38 is short, as the whole quantity of nitrogen of the upper vessel 34 and the upper part of the downtake 38 may entirely pass down into the lower vessel 39.

Nitrogen for cooling purposes as compared with other cooling gases involves various technical and economical advantages. Furthermore, evaporated nitrogen may be directly exhausted into the ambient atmosphere without any danger of injuries to health, of corrosion, fire, etc. Nitrogen has a boiling point at which frozen carbon dioxide is heavily supercooled, such supercooling being desirable, and no appreciable condensation of oxygen need be feared. Finally, liquification and storing of nitrogen does not require special caution, and normally particular purification from oxygen and hydrogen is not required because any residues of the two last-mentioned gases quickly escape from the liquid nitrogen due to their considerably lower boiling points so that kind of automatic purification of liquid nitrogen takes place.

After tapping of liquid nitrogen from the upper vessel 34, the heating coil 31 is energized so that the frozen carbon dioxide in the high-evacuated tube 32 is evaporated and flows to the analysing unit where it is heated to +40° C. and evaluated in a manner described more below.

It may be mentioned that all of the valves of the present example of apparatus are under remote control ("remote" need not be taken literally), preferably by electric control, and the valves may be solenoid valves or pneumatically controlled valves. In simpler embodiments a number of, or all of the valves may be adapted for manual control, however. When using valves designed for remote control, they should preferably be such that they may be manually controlled, too.

The apparatus is provided with a timer, not shown, electrically controlling the valves and the furnace 3 (and/or the operation of supplying the sample to and removing same from the furnace) and, if required, of the shown pumps.

The analysing apparatus operates as follows. A sample, for example a steel sample, is placed into the furnace 3 and is strongly heated therein in an oxygen flow supplied under pressure through the filters 1 and 2. As the heating continues the combustion of the carbon contents of the sample is completed such that the combustion into carbon dioxide is as complete as possible. Any non-combusted carbon monoxide is converted by the filter 6 into dioxide, and this filter may form part of the furnace 3. The resulting gas mixture consisting of oxygen and carbon dioxide is dried in the filter 7 and expanded by the choke 10 and then supplied to the freezing trap 12 separating the carbon dioxide from oxygen by freezing the dioxide. After freezing of the carbon dioxide in the trap, the whole pipe line, i.e., to the right of valve 11, is highly evacuated and then the frozen carbon dioxide is evaporated in the way described in the description of FIG. 2. The carbon dioxide then passes through the valve 15 and the second trap 16 into the measuring chamber 17a of the pressure gauge device 17. If the quantity of the produced carbon dioxide is relatively large, that is in practice frequently when the sample in the furnace 3 is relatively big, the valve 18 is automatically opened and the carbon dioxide then passes through this valve to the valve 20.

The volume of the connections from valve 11 to valve 18 should be as small as possible, not only in comparison with the volume of the chamber 17a so that also a very small quantity of carbon dioxide results in a well measurable pressure in the measuring chamber 17a. The quantity of carbon dioxide is measured by measuring the pressure which it exerts upon the diaphragm of the pressure gauge device and which is dependent on the quantity of carbon dioxide as the volume is constant.

It may be mentioned that the second freezing trap 16 is operative and consequently condenses the whole quantity of carbon dioxide by freezing when the carbon dioxide trapped in the first trap 12 is evaporated. The dioxide trapped in trap 16 will be re-evaporated at a given instant of time. Provided that the valve 18 of the output of the measuring chamber 17a is closed, it follows that almost all gas will be supplied to the chamber 17a. If the quantity of the gas is large, i.e. when the measuring range of the instrument 24 is to be automatically switched, the valve 18 is opened so that the gas is distributed through the whole space between the valves 15 and 20, so that the pressure of the gas decreases. Thus the range of pressures to which the diaphragm between the chambers 17a and 17b is subjected, does not vary much in spite of the considerably varying quantity of gas.

In the present example the valve is no usual excess pressure valve or relief valve, i.e. it is not loaded by a spring. Consequently, the pressure of the chambers 17a and 19 is equal when the valve 18 is open, and there are two volumes of measurement rendered effective alternatively in dependence on the quantity of gas, i.e. a small volume of measurement (volume of gas, the pressure of which is to be measured) comprising the chamber 17a, the trap 16 and the line extending between the valves 15 and 18, and a big volume comprising the small volume just mentioned plus chamber 19 and the line extending between the valves 18 and 20. The measuring principle is based on the equation of state of perfect gases which means that the product of the quantity of gas and the pressure divided by the product of the absolute temperature and the gas constant is constant. The relatively small deviations of carbon dioxide from said equation being correct for perfect gases only are well known and are automatically compensated in the measuring process.

The above timer, not shown, controls the apparatus in accordance with the below table wherein the individual operations are numbered in the left column, and the centre column shows the relative time of starting the operations in minutes and seconds from the instant (time 0) of starting the timer. As long as the timer and the whole apparatus are in their condition of rest but ready to operate, the change-over valve 9 connects the output of the filter 8 with the free atmosphere. The valves 11 and 13 are open, and the pumps 14, 21, 22 are running. A steel sample to be analysed may have a weight not exceeding 100 milligrams and is placed in the furnace 3. By depressing a key, the timer is switched on and the automatic measurement of the percentage of carbon contents of the steel sample starts.

| | Time | | |
|---|---|---|---|
| | Minutes | Seconds | Control function of the timer |
| Operation No: | | | |
| 1 | 0 | 00 | The timer starts. |
| 2 | 0 | 05 | The freezing trap 12 is made operative by lifting liquid nitrogen, see description of FIG. 2. |
| 3 | 0 | 15 | The timer opens the valves 18 and 20 so that the space between the (closed) valve 15 and the output (beyond 20) of unit 26 is evacuated. |
| 4 | 0 | 40 | The three-way valve 9 is switched such that the output of filter 8 is closed from the free atmosphere and is connected to choke 10. The oxygen flow from the furnace is allowed to pass to valve 15. |

| | Time | | |
|---|---|---|---|
| | Minutes | Seconds | Control function of the timer |
| Operation No: | | | |
| 5 | 0 | 40 | The heating power of the furnace 3 is switched on. The sample in the furnace is combusted. |
| 6 | 1 | 40 | The furnace is de-energized, and the combustion ceases or has ceased. |
| 7 | 1 | 50 | The second freezing trap 16 is made operative, see operation No. 2. |
| 8 | 2 | 10 | The valve 11 is closed and the valve 9 is switched over such that the input of choke 10 is closed and the output of the valve is open to the free atmosphere. The pump 14 is evacuating through the open valve 13 to remove any oxygen residue from trap 12 and connection lines. |
| 9 | 2 | 25 | The valve 13 is switched to closed state. |
| 10 | 2 | 30 | The input valve 15 of the analysing unit 26 is opened. |
| 11 | 2 | 30 | Liquid nitrogen is drained from the first trap 12, see description of FIG. 2. |
| 12 | 2 | 35 | The frozen carbon dioxide in trap 12 is evaporated by heating (energization of heating coil 32 in FIG. 2, see description thereof) and passes to trap 16 where it is re-frozen. |
| 13 | 3 | 30 | The heating coil 32 of the first trap 12 is de-energized but the two traps 12 and 16 remain interconnected through the open valve 15 during further 45 seconds for complete distillation and condensation of $CO_2$. |
| 14 | 4 | 15 | The valves 15, 18 and 20 are closed. |
| 15 | 4 | 15 | The cooling of second trap 16 is terminated by draining off liquid nitrogen, see description of FIG. 2. |
| 16 | 4 | 20 | The carbon dioxide in trap 16 is evaporated, see operation No. 12, and escapes to measuring chamber 17a. |
| 17 | 5 | 55 | The heating coil 32 of second trap 16 is de-energized. |
| 18 | 5 | 55 | The gas pressure in chamber 17a causes digital indication, on 24, of the percentage of carbon of the steel sample combusted in the furnace 3. |
| 19 | 6 | 00 | The timer is reset. The result of measurement displayed by instrument 24 remains visible until the timer is started again, operation No. 1. |

The large measuring volume between the valves 15 and 20 as defined above is put into operation not by the timer but by the amplifier 23. When a cycle of measurement is started, initially only the small measuring volume between the valves 15 and 18 is in operation. If the pressure prevailing in this small volume is increasing above a predetermined limit, and consequently, if also the voltage (or another signal representing a measurement) at the amplifier 23 increases and exceeds a corresponding limit, the excess voltage causes the valve 18 to be opened, and to be closed again not before operation (14), see the above table. The valve 18 should, however, be open also when the system is evacuated before measurement begins so that the whole unit 26 can be evacuated by the pumps 21, 22 without the necessity of using also the pump 14.

The ranges of measurement of the digital voltmeter and of the abovementioned range-switching limit of the two volumes of measurement are determined by a potentiometer, the adjustment of which is not, normally, altered.

The amplifier 23 being supplied with the output of the capacitive pressure gauge device 17 converts this output into an amplified D.C. voltage ranging between 0 and 5 volts in dependence on the measured pressure. The whole apparatus is calibrated such that the output of the amplifier is 1 mv./10 p.p.m. $CO_2$ when measuring by means of the small volume of measurement, and is 1 mv./100 p.p.m. $CO_2$ for the large volume. Switching from one volume to the other one occurs simultaneously with switching on, or change-over of a potentiometer of calibration for the two volumes. The corresponding ranges of the digital voltmeter 24 are 100 and 1000 mv.

When the small volume of measurement is in operation, there are consequently two ranges of measurement, viz, 100 and 1000 mv. corresponding to 0.1 and 1% C, respectively. For the large volume, the two ranges are likewise 100 and 1000 mv. corresponding, however, to 1% and 10% C, respectively.

The sensitivity of measurement is .00001% C, i.e. 0.1 p.p.m.=1 microgram carbon per gram of the sample. This means that if the weight of the sample is 1 gram, the minimum measurable percentage of carbon or variation of percentage of carbon is .0001% C. This corresponds to a step—i.e. increasement or decreasement of the indicated value by unit value—of the lowest indicated decade (order, i.e. the digit at the right end of the value) of the digital voltmeter.

Experiments with the apparatus described above have been carried out with different samples of steel and carbide hard metal. The carbon contents of the samples was different between .015% (150 p.p.m.) and 7% carbon. Up to .2% C the measurement was made automatically by means of said small volume. Above this percentage, the large volume was in operation. The weight of the samples was 10 milligrams, 100 milligrams and 1 gram. When the carbon percentage exceeded .015%, the accuracy of measurement was always better than 1%. For carbon percentages of C exceeding .25% the accuracy of measurement always was better than .5%. The total time of an analysis was between 4 and 7 minutes, i.e. 6 minutes for single steel samples and 4 minutes per sample analysis for a series of samples. The analysis of carbides is supposed to require slightly more time. By various measures, the time of a steel analysis may be pressed down to 3 minutes. It should be noted that the times just referred to are counted from the start and also include the time of combustion of the sample etc.

The apparatus operates very rapidly and is extremely accurate within a very great range of measurement though minute steel samples or the like of about .01 gram are sufficient. In this way it is rendered possible, for example, to investigate the carbon contents of dfferent places and at different depths of hardened, e.g. shallow surface hardened, articles of steel even if such articles are very small or intricate because removal of a chip of 10 mg.=approximately 1.3 mm.$^3$ suffices for being used as a sample.

An apparatus in accordance with the invention is not restricted to the above use. By an apparatus substantially similar to that described above it proved possible to determine quickly and reliably the percentage of carbon monoxide (and also of carbon dioxide) of the human breathing air for medical-diagnostical purposes. If desired, the furnace 3 may be omitted and the filters 1, 2, 5 and 6 may be modified accordingly such as to absorb the carbon dioxide contents of the breathing air and then to measure directly the remaining contents of carbon monoxide or, preferably, to convert the monoxide into dioxide before measuring same. By suitable modification the apparatus may be used for determing the percentage of sulphur, hydrogen or nitrogen of substances. As is also the case with carbon and carbon compounds, the measurement is by no means restricted to such contents in metals or other solids. For example, the contents of carbon, hydrogen, sulphur and many other substances, particularly in organic samples such as plastics, may be measured. For this purpose the furnace 3 frequently should not be an induction furnace but a dielectrical radio-frequency furnace, a radiation furnace or a heating-tube furnace provided that a furnace is required at all. To some extent, also other filters and other freezing temperatures may be chosen. However, the substance to be measured must not be able to leak into the heating space containing the sample from the ambient atmosphere if it is present in the atmosphere, and must not be in such a form that it may be separated by the traps as a gas to be measured, nor in such a form that it may be converted in the apparatus to a form which might be separated in the way just referred to.

Separation of the gas to be measured by freezing same may of course be carried out in another way than by the freezing traps described above. Also the pressure gauge device may be of another type than that comprising a capacitative pressure gauge 17 such as a McLeod manometer. Digital indication of the measured percentage is not required. Such and other modifications are advisable, particularly for economical reasons when the speed and accuracy of analysis need not satisfy quite as high requirements as those satisfied by the apparatus described above by way of example.

What I claim is:

1. A method for measuring the quantity of a gas component of a gas mixture comprising separating the gas component to be measured from all other gas components of said gas mixture which freeze at a higher temperature than the gas component, cooling said separated gas mixture at reduced pressure to a temperature below the freezing point of the gas component to freeze only the gas component to be measured and prevent condensation of any of the remaining gas components, removing the remaining gas components from the frozen component, heating the frozen gas component to a predetermined temperature to gasify the component, passing the gasified component into a space which is hermetically sealed, evacuated and normally maintained at a temperature above the boiling point of the gas component to be measured, measuring the pressure of the gasified component in the hermetically sealed space, the volume of the hermetically sealed space being increaseable a known amount when necessary to accommodate increased quantities of the gasified gas component when such qantities exceed a predetermined limit and calibrating the measurement of the pressure of the gasified component so that when the volume of the hermetically sealed space is increased repeated calibration is unnecessary.

2. A method as claimed in claim 1 and further comprising producing the gas mixture containing the gas component to be measured by converting at least one component of a known quantity of a sample composition to said gas component, and removing by absorption all other gas components which freeze at a higher temperature than the gas component to be measured.

3. A method as claimed in claim 1 wherein the gas component to be measured is an oxide and wherein the oxide gas component is cooled by heat exchange with a coolant which is non-corrosive, non-oxidizing, non-reducing and has a freezing point below the gasification point of the oxide gas component in vacuo, and above the boiling point of oxygen in vacuo and which has a boiling point at least equal to the boiling point of oxygen.

4. A method as claimed in claim 2 wherein the gas component comprises carbon dioxide and is produced by heating a known quantity of a sample composition containing carbon in the presence of oxygen to the temperature of combustion to form a gas mixture containing carbon oxides, removing all gaseous components from the mixture other than oxygen and carbon oxides, converting any carbon monoxide to carbon dioxide, cooling the mixture of carbon dioxide and oxygen below the freezing point of carbon dioxide but above the condensation point of oxygen and the boiling point of poxygen in vacuo, evacuating the oxygen while maintaining the carbon dioxide in the frozen state, heating the frozen carbon dioxide to gasify same, and using the gas pressure of said carbon dioxide gas to indicate the quantity of carbon dioxide present and hence the quantity of carbon in said sample composition.

5. A method as claimed in claim 4 and further comprising recooling the gasified carbon dioxide in vacuo below the freezing point thereof and reheating the refrozen carbon dioxide to regasify same prior to using the gas pressure of said regasified carbon dioxide to indicate the quantity of carbon dioxide and maintaining the temperature of the hermetically sealed space above the freezing point of water.

6. A method as claimed in claim 4 and further comprising pressurizing the gas mixture and after removing all gaseous components therefrom other than oxygen and carbon oxides and converting any carbon monoxide to carbon dioxide, expanding said pressurized oxygen and carbon dioxide to cool the same prior to cooling said mixture of oxygen and carbon dioxide to freeze the carbon dioxide.

7. Apparatus for measuring the quantity of a gas component of a gas mixture comprising means for separating the gas component to be measured from all other gas components in the mixture which freeze at at higher temperature than the gas component, means for cooling said separated gas mixture to a temperature below the freezing point of the gas component to freeze only the gas component to be measured, means for removing any remaining gas components from the frozen component, means for heating said frozen gas component to gasify the component, a hermetically sealable chamber, means for evacuating said chamber, means for normally maintaining said chamber at a known stable temperature above the boiling point of the gas component to be measured, means for passing the gasified gas component into said chamber, differential pressure means in communication with said chamber for measuring the pressure of said gas component, and means for enlarging the hermetically sealable chamber to accommodate increased volumes of the gas component to be measured so that the pressure to be measured by the differential pressure means will not exceed an upper limit, said differential pressure means being capable of variable calibration to compensate for the enlarged chamber so as to indicate the quantity of the gas component.

8. Apparatus as claimed in claim 7 wherein the differential pressure means includes a reference pressure chamber in communication with the means for evacuating said hermetically sealable chamber.

9. Apparatus as claimed in claim 7, wherein the separating means comprises means for absorbing all other gas components which freeze at a higher temperature than the gas component to be measured and wherein the means for removing any remaining gas components from the frozen component comprises evacuating means.

10. Apparatus as claimed in claim 7 and further comprising furnace means for receiving a sample composition containing a component to be converted to the gas component to be measured, and means for supplying oxygen to said furnace means to form the gas mixture containing the gas component to be measured as oxides.

References Cited

UNITED STATES PATENTS

| | | | | |
|---|---|---|---|---|
| 2,286,384 | 6/1942 | Sanderson | | 73—23 |
| 2,429,555 | 10/1947 | Langford et al. | | 73—25 |
| 2,601,272 | 6/1952 | Frost, Jr. | | 73—23 |

OTHER REFERENCES

"Sampling and Analysis of Carbon and Alloy Steels," 1948, pp. 41–47, 50–53.

RICHARD C. QUEISSER, Primary Examiner

E. J. KOCH, Assistant Examiner